United States Patent [19]

Nonaka et al.

[11] Patent Number: 5,195,026
[45] Date of Patent: Mar. 16, 1993

[54] METHOD AND APPARATUS FOR COMPUTER CONTROLLED NONLINEAR OPTIMIZATION

[75] Inventors: Hisanori Nonaka, Hitachi; Yasuhiro Kobayashi, Katsuta, both of Japan

[73] Assignee: Hitachi, Ltd., Tokyo, Japan

[21] Appl. No.: 579,476

[22] Filed: Sep. 7, 1990

[30] Foreign Application Priority Data

Sep. 12, 1989 [JP] Japan .................. 1-236514

[51] Int. Cl.⁵ ............................................. G05B 13/02
[52] U.S. Cl. ........................................ 364/148; 395/51
[58] Field of Search .................. 364/148, 149, 150; 395/50-68, 13

[56] References Cited

U.S. PATENT DOCUMENTS

| | | | |
|---|---|---|---|
| 3,840,725 | 10/1974 | Grezdov et al. | |
| 4,706,223 | 11/1987 | Zimmerman | |
| 4,713,775 | 12/1987 | Scott et al. | 395/50 |
| 4,740,886 | 4/1988 | Tanifuji et al. | 364/150 |
| 4,744,026 | 5/1988 | Vanderbei | |
| 4,744,027 | 5/1988 | Bayer et al. | |
| 4,744,028 | 5/1988 | Karmarkar | |
| 4,910,660 | 3/1990 | Li | 364/148 |
| 4,935,877 | 6/1990 | Koza | 395/13 |
| 5,006,992 | 4/1991 | Sheirik | 364/148 |
| 5,043,915 | 8/1991 | Suwa et al. | 395/51 |

FOREIGN PATENT DOCUMENTS

62-61101 3/1987 Japan .
1-236514 9/1989 Japan .

OTHER PUBLICATIONS

"Nonlinear Programming" by Hiroshi Konno and Hiroshi Yamashita published by Nikka Giren in 1978, pp. 215 to 225 and 270 to 277.

"Iterative Methods for Nonlinear Optimization Problems" by S. L. S. Jacoby, J. S. Kowalik and J. T. Pizzo published by Prentice-Hall, Inc., 1972, pp. 78-83, 112-117, 168-179 and 220-223.

"The Nonlinear Programming Method of Wilson, Han, and Powell with an Augmented Lagrangian Type Line Search Function", by Klaus Schittkowski published by Numerische Mathematik vol. 38, in 1981 pp. 83 to 114.

Primary Examiner—Jerry Smith
Assistant Examiner—Jim Trammell
Attorney, Agent, or Firm—Kenyon & Kenyon

[57] ABSTRACT

In nonlinear optimization a plurality of optimization methods are stored in a computer system as are techniques (knowledge) for applying those methods. Such techniques may be divided into common knowledge which are techniques applicable to all nonlinear optimization methods and domain knowledge which are techniques applicable to a corresponding one of the methods. When an optimization problem is input to the computer system, the system first selects one of the methods and applies it to the problem using the common knowledge and any relevant domain knowledge. If that method does not produce an optimum result, the system tries to solve the problem with another method, again making use of the common knowledge and the respective domain knowledge. This process is repeated until an optimum solution is obtained. The method is applicable to computer control of industrial plants and systems and to computer aided design.

17 Claims, 10 Drawing Sheets

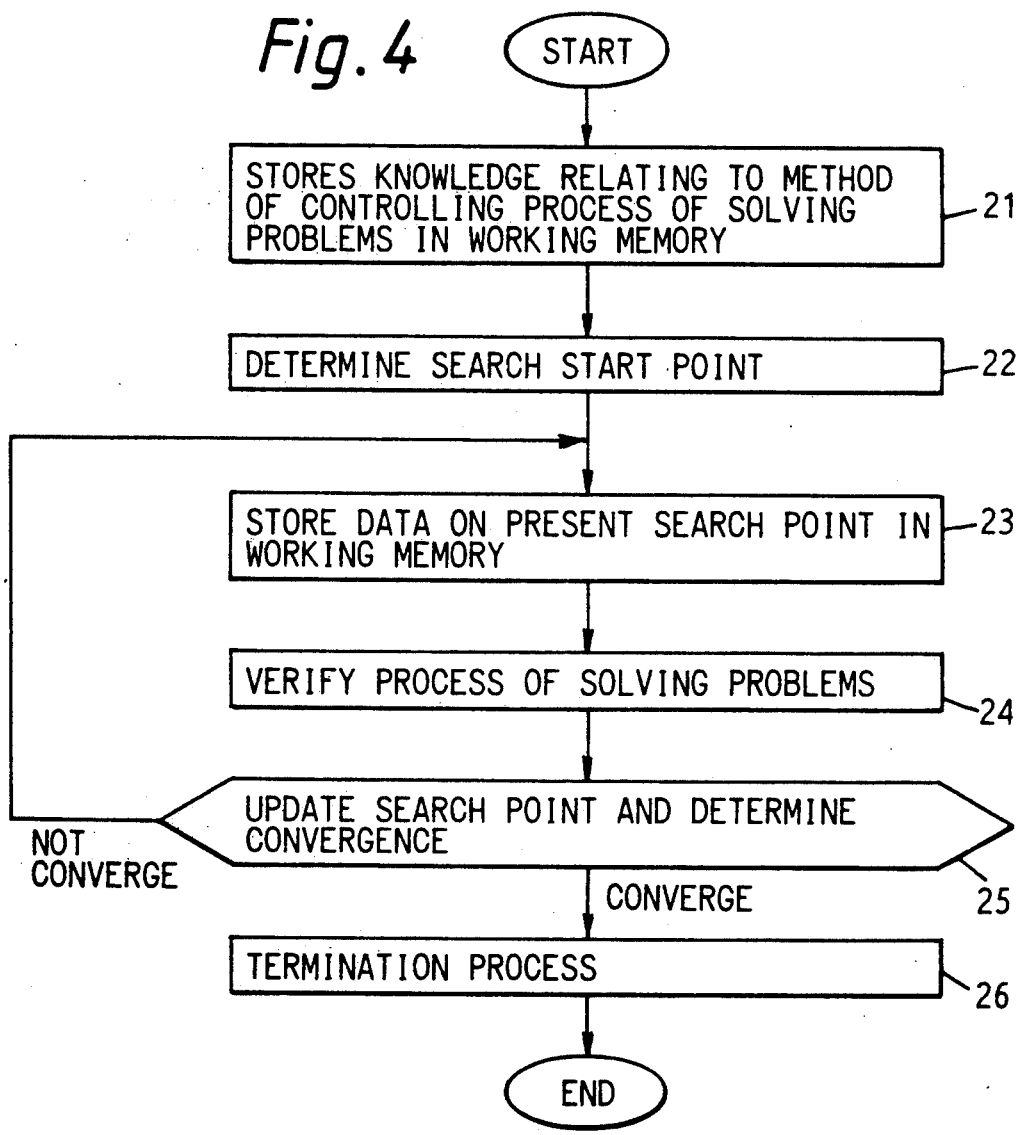

Fig. 5

| RULE NO. | CONDITION UNIT | EXECUTION UNIT |
|---|---|---|
| 1 | $X_n = X_i$ ($i = 1, n-1$) | $X_n = X_n + \mathcal{E}$ |
| 2 | COORDINATES OF PRESENT SEARCH POINT APPEARED THREE TIMES IN THE PAST | SEARCH POINT IS RETURNED TO ORIGINAL POINT TO TERMINATE VERIFICATION |
| 3 | $f(X_n) = f(X_{n-1})$ | VERIFICATION PROCESS IS TERMINATED WITH $X_n = \dfrac{X_n + X_{n-1}}{2}$ |

$X_i$ : POSITION VECTOR OF i-th SEARCH POINT
$X_n$ : POSITION VECTOR OF PRESENT SEARCH POINT
$\mathcal{E}$ : VERY SMALL VECTOR
$f(X)$ : OBJECTIVE FUNCTION FOR X

Fig. 6

| SEARCH POINT NO. | 5 |
|---|---|
| COORDINATES | 3.5 |
| OBJECTIVE FUNCTION | 39.0625 |
| INCLINATION OF OBJECTIVE FUNCTION | 62.5 |

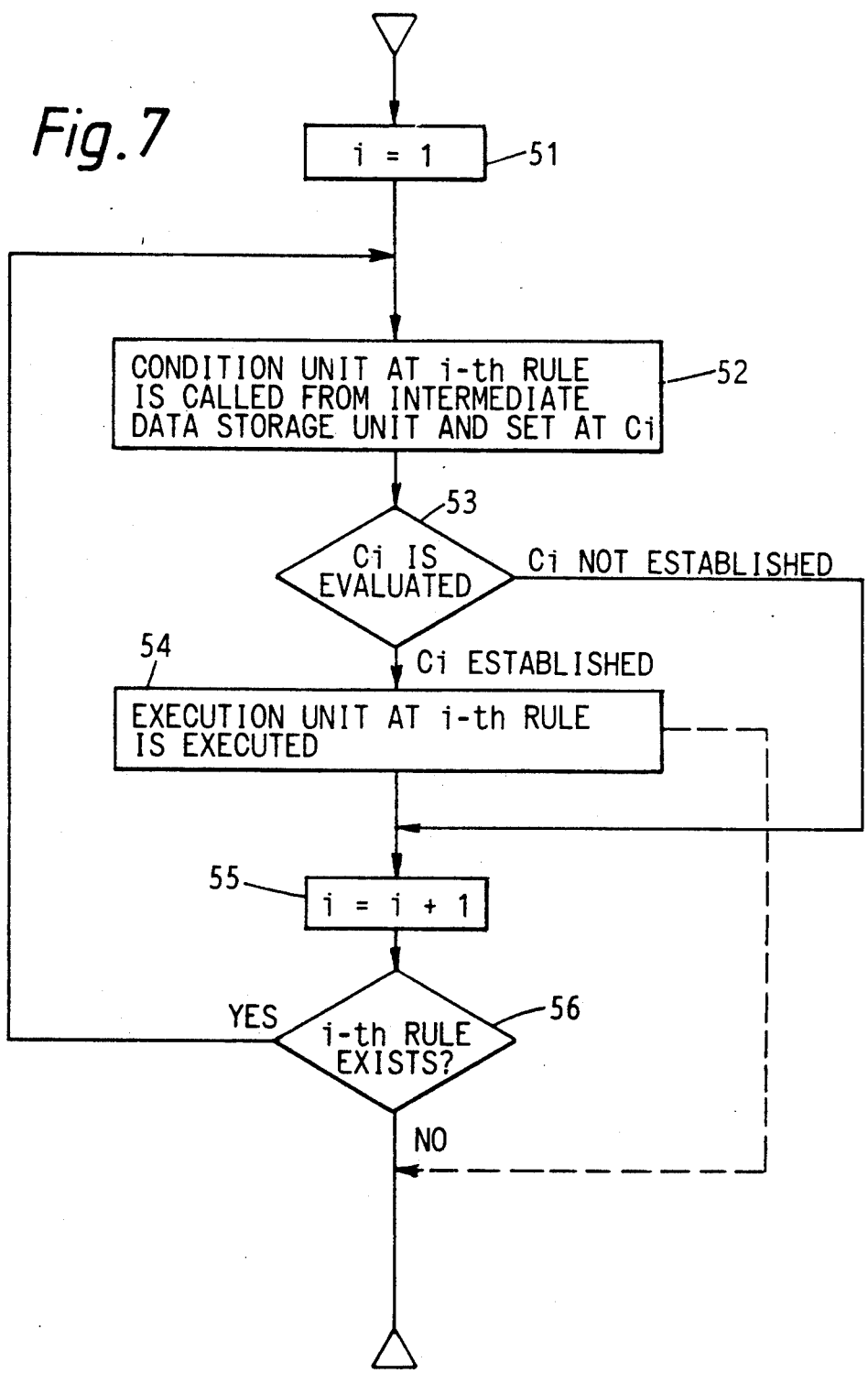

Fig.9

| NO. | x | f(x) | ∇f(x) | REMARKS |
|---|---|---|---|---|
| 1 | 0.46 | $8.5 \times 10^{-2}$ | $-6.2 \times 10^{-1}$ | SEARCH START POINT |
| 2 | 0.56 | $3.7 \times 10^{-2}$ | $-3.4 \times 10^{-1}$ | |
| ⋮ | ⋮ | ⋮ | ⋮ | |
| 6 | 0.96 | $2.56 \times 10^{-6}$ | $-2.56 \times 10^{-4}$ | |
| 7 | 1.06 | $1.30 \times 10^{-5}$ | $8.64 \times 10^{-4}$ | |
| 8 | 0.96 | $2.56 \times 10^{-6}$ | $-2.56 \times 10^{-4}$ | |
| 8' | 0.97 | $8.10 \times 10^{-7}$ | $-1.08 \times 10^{-4}$ | SEARCH POINT CHANGED BY APPLYING RULE NO.1 |
| 9 | 1.07 | $2.40 \times 10^{-5}$ | $1.37 \times 10^{-3}$ | |
| 10 | 0.97 | $8.1 \times 10^{-7}$ | $-1.08 \times 10^{-4}$ | |
| 10' | 0.98 | $1.60 \times 10^{-7}$ | $-3.2 \times 10^{-5}$ | SEARCH POINT CHANGED BY APPLYING RULE NO.1 |
| 11 | 1.08 | $4.10 \times 10^{-5}$ | $2.05 \times 10^{-3}$ | |
| 12 | 0.98 | $1.60 \times 10^{-7}$ | $-3.2 \times 10^{-5}$ | CONVERGE AT $|\nabla f(x)| < 10^{-4}$ |

$$f(x) = (x-1)^4$$
$$\nabla f(x) = 4(x-1)^3$$

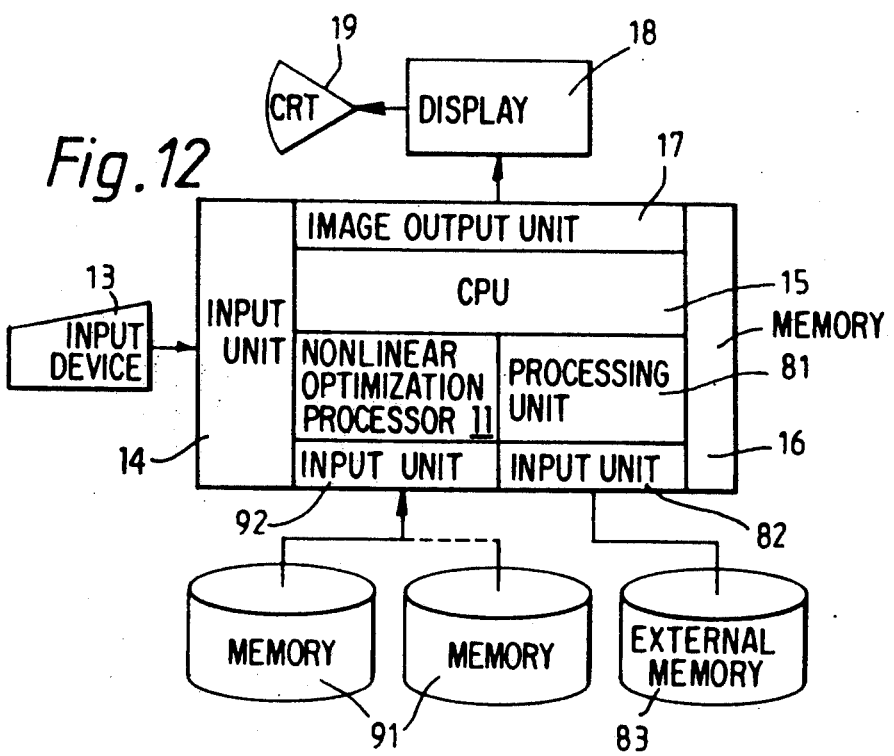

METHOD AND APPARATUS FOR COMPUTER CONTROLLED NONLINEAR OPTIMIZATION

BACKGROUND OF THE INVENTION

1. Field of the Invention

The present invention relates to a method of computer controlled nonlinear optimization which is particularly, but not exclusively, designed for optimum control of production and operating systems described by mathematical models or computer aided design. The present invention also relates to an apparatus for performing such a method.

2. Description of the Prior Art

Optimization techniques are concerned with maximizing or minimizing an objective function which is defined by at least one variable. When the relationship is nonlinear, it is not straightforward to obtain an optimum solution to such a problem. In general, a nonlinear optimization problem is generally expressed by the following equation:

| Optimize: | $f(x)$ |
|---|---|
| Subject to: | $g_i(x) \geq 0 \ (\forall i \in MI)$ |
|  | $h_j(x) = 0 \ (\forall j \in ME)$ | where:

$f(x)$ denotes an objective function;

$g_i(x)$ represents non-equality constraints;

$h_j(x)$ represents equality constraints;

MI, ME respectively represent character-added sets of non-equality and equality constraints; and $x$ represents co-ordinates of a point in the n-th space, representing n pieces of variables on the nonlinear optimization problem.

For a nonlinear optimization problem a decisive solution method corresponding to e.g. the simplex method or Karmarkar's method (see U.S. Pat. No. 4,744,028) cannot be obtained. As will be discussed in more detail later, there are many nonlinear optimization methods, such as e.g.: those shown in the book "Nonlinear Programming" (Nikka Giren, 1978) and the book "Iterative Methods of Nonlinear Optimization Problems" by S. L. S. Jacoby, J. S. Kowalik and J. T. Pizzo, published by Prentice Hall in 1972, such as:

(i) the transformation method of optimizing functions incorporating the objective and constraints functions;

(ii) the reduced gradient method in the linear planning expanded to nonlinear optimization;

(iii) sequential quadratic programming for improving the search point by repeating the quadratic programming.

Each of these techniques is generally intended to let the objective function converge at the optimum point that is not ultimately improvable further by updating the search point toward the improvement of the objective function from the starting point of search.

SUMMARY OF THE INVENTION

Thus, although many nonlinear optimization methods are known, none have general applicability to all problems, and it is therefore necessary, for a given problem, to apply a series of methods until a satisfactory solution is obtained.

In general, such optimization methods are applied by computer techniques, and the programs to carry out those methods contain rules or techniques (hereinafter referred to as "knowledge") which control the application of those methods to prevent the methods being carried out incorrectly (e.g. to avoid repetitional loops, or similar effects). However, such knowledge is written into the program for each method, so that the method and the knowledge are mixed. Thus, each method has knowledge inextricably linked therewith, and the amount of memory space needed to store a wide range of methods is thus large.

The present inventors have appreciated that some types of knowledge are general to all nonlinear optimization methods, whilst others are specific to a particular method. In the subsequent discussion, these two types of knowledge will be referred to as common knowledge and domain knowledge respectively. Common knowledge is knowledge which seeks to prevent failure of the nonlinear optimization method in a way which is not dependent on the method itself, whilst domain knowledge is intended to solve problems of failure which are specific to the method.

Although knowledge for preventing both of these types of failures is known, existing techniques have not attempted to identify separate types of knowledge in the way discussed above. Instead, programs for nonlinear optimization methods have generally been considered in an empirical way, using trial and error to resolve the problems, i.e. to determine which knowledge is appropriate. No systematic approach has been taken.

The present invention seeks to make use of the appreciation by the inventors that knowledge can be of two types, and proposes that at least the common knowledge be separated from the optimization methods, and stored separately. Then, the common knowledge may be applied to any optimization method when that method is applied to a problem.

Suppose that there is a problem which needs nonlinear optimization. Then, a first nonlinear optimization method may be extracted from a suitable storage device, and applied to the problem in conjunction with the common knowledge. If that method does not achieve an optimum solution, a second method may be obtained from the storage device and applied to the problem, again in conjunction with the common knowledge. It can be seen that this reduces the amount of memory needed, since the common knowledge can be used in common for all the methods. In the known systems, where the common knowledge and the method were inextricably linked, the common knowledge was effectively stored repeatedly, or as many times as there were methods.

Preferably, the present invention goes further than this, and proposes that the domain knowledge is also separated from the stored nonlinear optimization methods. Then, when a method is applied to a problem, only the domain knowledge which relates to that particular method need be extracted from the storage device. It should be noted that the domain knowledge for a particular method may involve a plurality of separate techniques, if such techniques are known for that method. Of course, it is possible for the domain knowledge to comprise only one technique, for a given method, and it may be possible for there to be no domain knowledge for a method, so that only the common knowledge is used when the method is applied to a problem.

As was stated earlier, the present invention also relates to an apparatus for carrying out a method of nonlinear optimization. Thus, such an apparatus will have separate storage devices for the nonlinear optimization methods, for the common knowledge, and for the domain knowledge. Of course, in physical terms, those storage devices may simply be separate memory areas in a common memory, but the important feature is that the methods and the knowledge are separated, so that it is possible to extract only the knowledge that is needed.

The present invention has the advantage of improving the efficiency of nonlinear programming, and to improve the performance of optimization programs, in addition to enabling the working memory of any computer system in which the present invention is used to be minimized.

BRIEF DESCRIPTION OF THE DRAWINGS

Embodiments of the present invention will now be described in detail, by way of example, with reference to the accompanying drawings in which:

FIG. 4 is a flow chart showing steps in one optimization method which may be used in the present invention;

FIG. 5 shows knowledge relating to the method of FIG. 4;

FIG. 6 illustrates data relating to a search point;

FIG. 7 is a flow chart showing stages in an optimization method used in the present invention;

FIG. 9 is a table summarizing the results of one optimization method;

FIG. 12 is a block diagram of a computer system incorporating the present invention being the combinations of the systems of FIGS. 10 and 11;

FIG. 13 shows the application of a system according to the present invention in control of an industrial plant;

DETAILED DESCRIPTION

Figure 1:
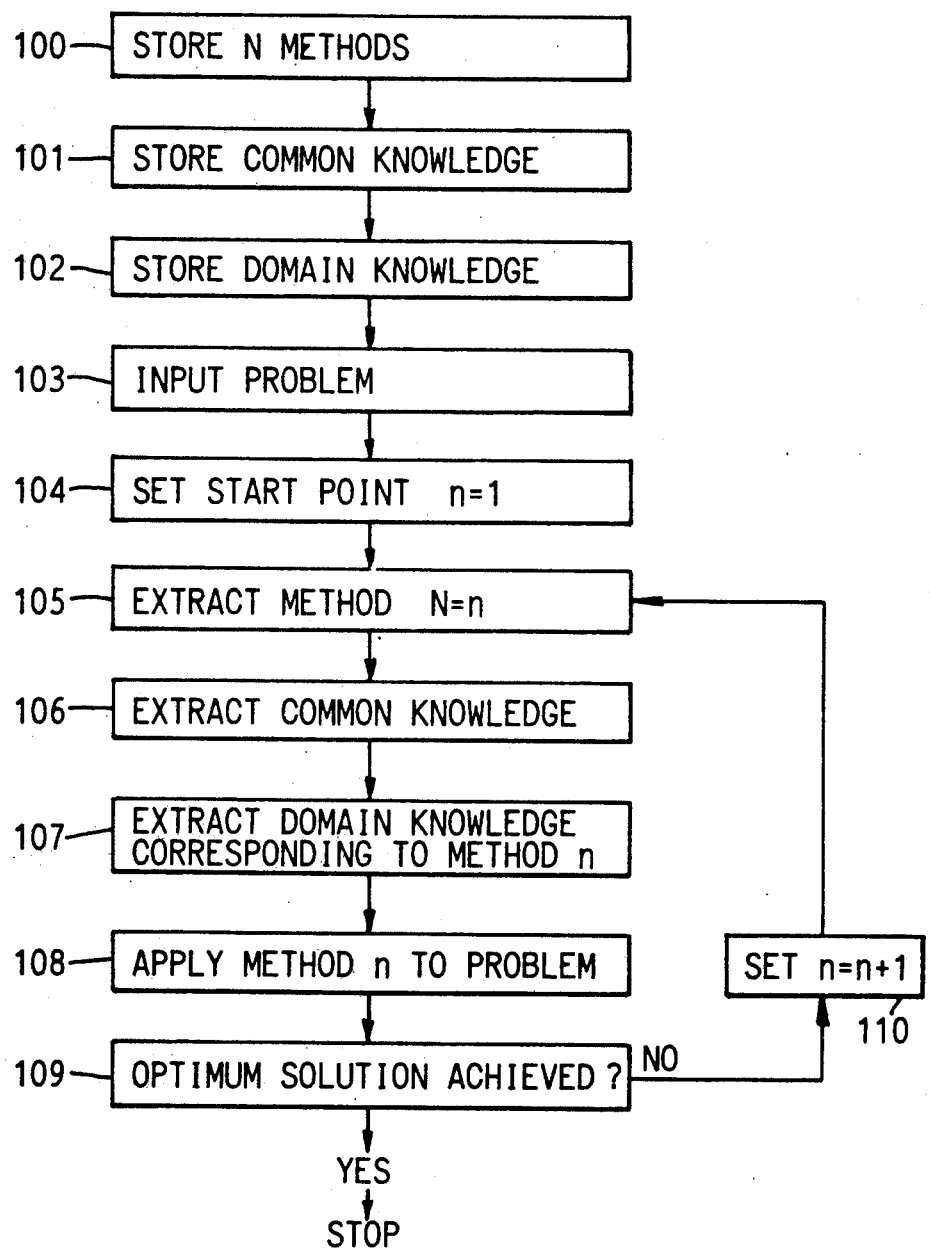
FIG. 1 is a flow-chart showing the steps of a method according to the present invention.

Referring first to FIG. 1, the general principles of the method of nonlinear optimization according to the present invention will be discussed.

First, at step 100, a plurality (number N) of nonlinear optimization methods are stored. In general, these methods may be known methods but it should be noted that no knowledge is stored with those methods. Instead, at Step 101, common knowledge common to all the methods is stored, and at Step 102 domain knowledge is stored, with each technique of the domain knowledge, corresponding to a particular one of the N methods. It can be appreciated that Steps 100, 101, 102 may be carried out as part of a setting-up operation for the computer system of the present invention.

Subsequently, a problem in need of nonlinear optimization is input at Step 103. The problem may relate to the control of a technological or industrial process or system or the design of a technological or industrial device, but the present invention is not limited to any one of these. A suitable counter providing a count number n is set to 1, which sets the start point, and at Step 105 the method then corresponding to the set number n, i.e. the first method at this stage, is extracted, and is the common knowledge at Step 106 and the domain knowledge corresponding to method n at Step 107. Then, method n (i.e. the first method at this stage), is applied to the problem at Step 108. Step 109 investigates whether the method n gives an optimum solution. If it does, then processing can stop. However, if it does not, processing moves to Step 110, in which n is incremented by 1, and processing returns to Step 105 to extract a further method, i.e. the second method at this stage. Steps 105 to 110 ar then repeated for each method, until Step 109 determines that an optimum solution has been achieved.

Of course, it is necessary to know the methods and knowledge that are to be stored. As was mentioned earlier, many nonlinear optimization methods are known, and examples are listed in Table 1.

TABLE 1

1. METHODS FOR OPTIMIZATION ALONG A LINE
   (i) Simultaneous and Nonoptimal Sequential Search Methods
   (ii) Fibonacci Search
   (iii) Golden Section Search
   (iv) Search by Low-Order Polynomial Approximation
   (v) Univariate Search with Multivariate Methods
   (vi) Nonoptimal Step Methods
2. DIRECT SEARCH METHODS
   (i) Pattern Search Method
   (ii) The Method of Rotating Coordinates
   (iii) Modified Rotating Coordinate Method
   (iv) The Simplex Method
   (v) Random Methods
   (vi) Minimization by a Sequence of Quadratic Programs
3. DESCENT TECHNIQUES
   (i) First-Order Gradient (Steepest Descent) Techniques
   (ii) Second-Order Gradient (Newton) Techniques
   (iii) Conjugate Directions Techniques
   (iv) Generalized Conjugate Gradient Methods
   (v) Variable Metric Methods
4. TRANSFORMATION METHODS
   (i) Interior Point Transformation and its Extensions
   (ii) Modified Interior Point Transformation
   (iii) Least-Squares Transformation
5. METHODS FOR CONSTRAINED PROBLEMS
   (i) Complex Method
   (ii) Cutting Plane Method
   (iii) Method of Approximate Programming (MAP)
   (iv) Methods of Feasible Directions
   (v) Modified Feasible Directions Method
   (vi) Gradient Projection Method
   (vii) Reduced Gradient Method Furthermore, examples of common knowledge are listed in Table 2.

TABLE 2

SOME EXAMPLES OF COMMON KNOWLEDGE

| Name of Knowledge | Content |
| --- | --- |
| Common Knowledge-1 | If Cond. 1 = 1 & Cond. 2 = 1 Then terminate the optimization. (X is the solution of the optimization problem.) |

TABLE 2-continued

SOME EXAMPLES OF COMMON KNOWLEDGE

| Common Knowledge-2 | If Cond. 1 = 0 & Cond. 3 = 0 Then continue the optimization. |
|---|---|
| Common Knowledge-3 | If (Cond. 1 = 1 & Cond. 2 = 0 or (Cond. 1 = & Cond. 3 = 1) Then move present search point to a random point. |

Where Cond. I = 1: Condition-I is satisfied.
Cond. I = 0: Condition -I is not satisfied.

| Name of Condition | Content |
|---|---|
| Condition-1 | $|F(X) - F(X')/(X-X')| < \epsilon$ |
| Condition-2 | All of Constraints are satisfied |
| Condition-3 | X is already appeared during the current optimization process. |

X: Present Search Point in N-th Space
X': Former Search Point in N-th Space
F(X): Objective Function
$\epsilon$: Machine Epsilon (Depends on Hardware)

Furthermore, examples of domain knowledge are known. For example, knowledge relating to sequential quadratic programming has been proposed by K. Schittkowski entitled "The Nonlinear Programming Method of Wilson, Hann and Powell with an Augmented Legrangian Type Live Search Function", in Numer. Math., Vol. 38, pages 83-114 (1981). This particular technique, called RESTART, is a set of domain knowledge which aims to recover from a failure to solve the problem of the Cholesky dissolution of the secondary coefficient determinant of the Lagrangian type function by the accumulation of numerical errors in the nonlinear optimization calculation. Furthermore, as mentioned above, this technique was applicable only to sequential quadratic programming.

Other examples of domain knowledge are listed in Table 3.

TABLE 3

SOME EXAMPLES OF DOMAIN KNOWLEDGE

Example-1 (Domain Knowledge in Conjugate Gradient Method)
A knowledge to decide iteration number to reset the direction vector to steepest descent direction.
A knowledge to select an appropriate formulation to decide search direction.
Example-2 (Domain Knowledge in Penalty Function Method)
A knowledge to decide when to start FPS (Feasible Point Search).
Example-3 (Domain Knowledge in Multiplier Method)
A knowledge to decide the number of Kuhn-Tucker Multiplier.
Example-4 (Domain Knowledge in Quasi-Newton Method)
A knowledge to select an appropriate formulation to decide search direction.

p.s. In most of optimization methods, a Knowledge to decide search direction strongly depends on the method itself.

Figure 2:
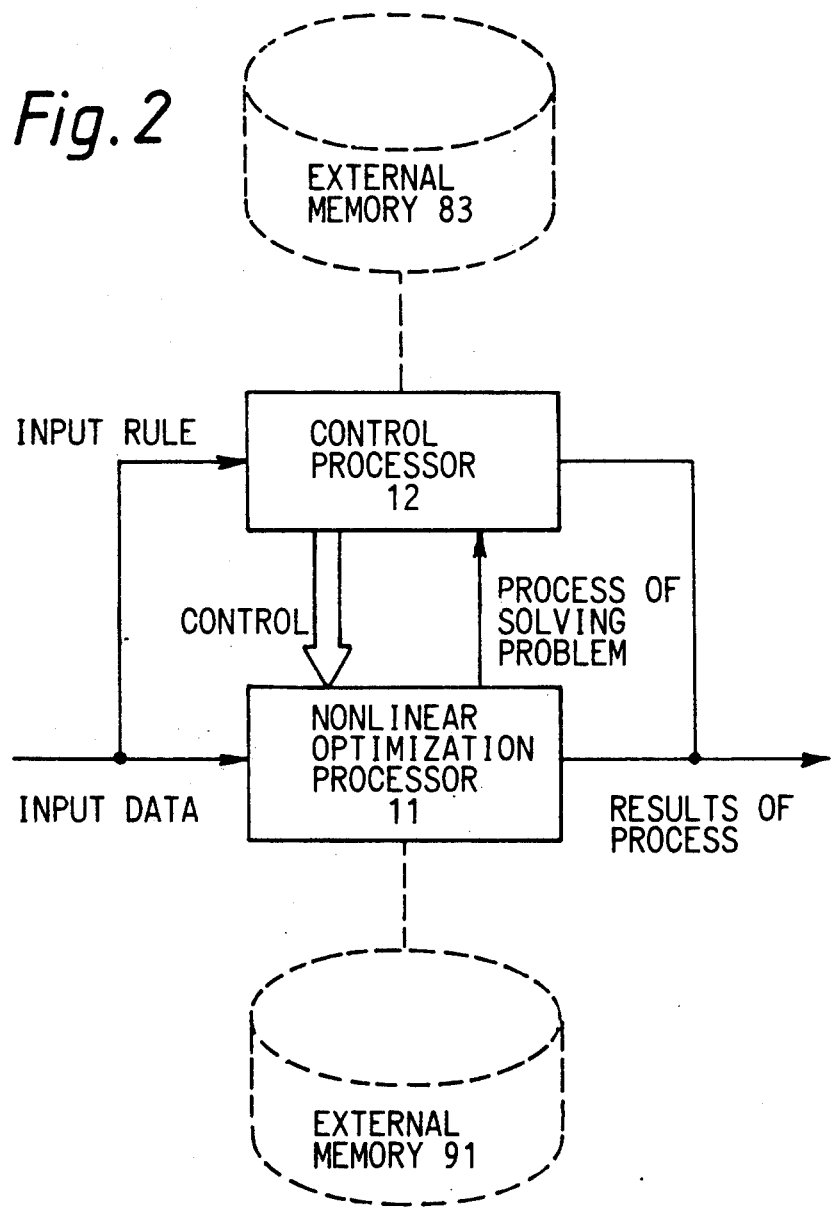
FIG. 2 is a schematic block diagram showing the basic components of a computer system which may operate according to the present invention.

The general structure of a computer apparatus for carrying out a nonlinear optimization method such as that shown in FIG. 1 is shown schematically in FIG. 2. Input data, i.e. problems, are input to a nonlinear optimization processor 11, which applies to that data a method of optimization. In other words, the nonlinear optimization processor 11 solves problems by making use of the present such points as inputs in accordance with a nonlinear optimization method, whilst updating the search points.

A control processor 12 investigates the method being carried out, and in particular considers the optimization method being applied by the nonlinear optimization processor 11, and if it appears that the method is unlikely to obtain a satisfactory solution, the control processor 12 instructs the nonlinear optimization processor 11 to change from the method currently being used to another method.

FIG. 2 shows two external storage devices 83, 91. External storage device 83 contains common knowledge, and passes the information to the control processor 12 for use in controlling the method being applied by the nonlinear optimization processor 11. The other external storage device 91 contains the domain knowledge, which is applied directly to the nonlinear optimization processor since it is specific to the method being applied.

It can thus be appreciated that the methods are each represented by specific programs of a computer system with the knowledge being data applied to those programs. The selection of the programs by e.g. the method of FIG. 1 is then controlled by a control program.

Figure 3:
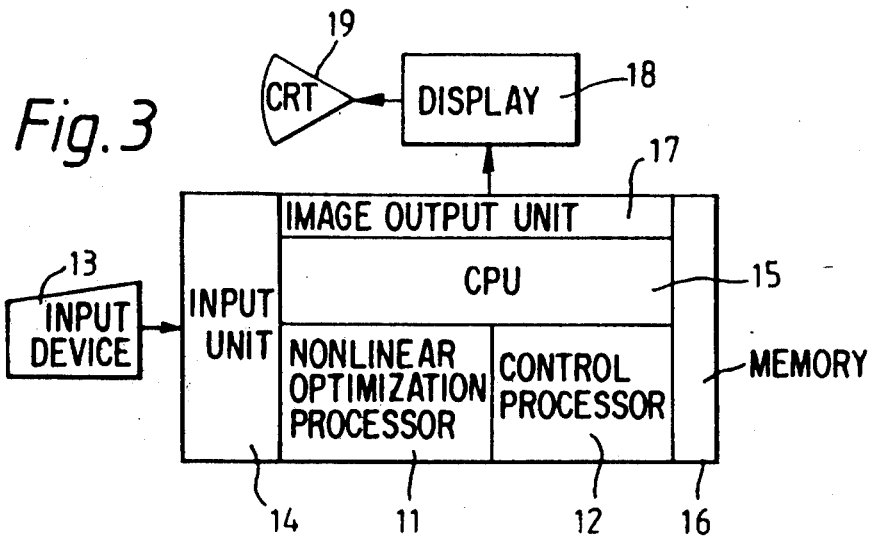
FIG. 3 is a more detailed block diagram of the computer system of FIG. 2.

FIG. 3 shows a development of the computer apparatus of FIG. 2, and the same reference numerals are used to indicate corresponding parts. FIG. 3, however, shows the input device 13 which permits input of nonlinear optimization problems, knowledge for controlling the optimization calculations and search start points. These may be input from the input device 13 and passed via an input unit 14 to a working memory 16, and if necessary from there to a permanent memory (not shown). Methods for nonlinear optimization are also stored (in the form of programs), and at any time one of those methods can be extracted and stored in the working memory 16 for application to a particular problem. The nonlinear optimization processor 11 and the control processor 12 then perform the functions described earlier, under the control of a central processing unit (CPU) 15. If desired, an image representing the solution may be passed from an image output unit 17 to a display unit 18, which may be connected to a suitable output device 19 such as a screen (CRT or VDU) or a printer. Such display is useful when the present invention is applied to computer aided design. The output may also be used to control an industrial or technological process.

One specific nonlinear optimization method, making use of common knowledge and domain knowledge, will now be described with reference to FIGS. 4 to 8.

FIG. 4 shows the control procedure of a process of solving problems which may be stored in the control processor 12 and used in a method according to the present invention.

At Step 21, knowledge regarding the method of controlling the process of solving problems is supplied from the input device 13 and stored in the working memory 16.

FIG. 5 shows an example of common knowledge, i.e. knowledge concerning the method of controlling the process of solving problems which does not depend on the nonlinear optimization method employed in this embodiment. In this embodiment, that knowledge is given as a rule comprising condition and execution parts.

At Step 22 of FIG. 4, the coordinates of the search start point are supplied from the input device 13 and stored in the working memory 16.

At Step 23, data regarding the present search point is stored in the working memory 16. FIG. 6 shows an example of data on the search point. As illustrated, the data regarding the search point includes the coordinates of the search point, the value of objective function at the search point and the inclination of the objective function, these items being stored with each being numbered.

At Step 24 of FIG. 4, the method of solving problems is verified in accordance with the data on the process of revising the search point stored in the working memory 16. The verification of the method of solving problems controls the method of solving problems using the common knowledge so as to prevent failures of the method.

FIG. 7 shows a procedure of verifying the method of solving problems. In this procedure, the condition part shown in FIG. 5 is sequentially evaluated to allow the execution part of the rule to be executed whenever the condition part is established.

At Step 51, verification of the process of solving problems begins at the rule number i=1. At Step 52, the condition part of the i-th rule is extracted from the working memory 16 and set as Ci. At Step 53, the condition part Ci is evaluated and the process proceeds to Step 54 when the condition is established. At Step 54, the execution part of the i-th rule is executed. However, Step 54 is skipped if the condition part Ci is not established in Step 53 and the process proceeds to Step 55. At Step 55, i is replaced by i+1. In Step 56, a decision is made as to whether a rule corresponding to the number incremented by 1 exists. If there exists such a rule, the procedures of Step 52 through Step 56 are repeated and if no such rule exists, the procedure of verifying the method of solving problems is terminated. The dotted line drawn from Step 54 indicates a flow of the process when the rule execution unit instructs the termination of a verifying process at Step 24.

Thus, if this stage is reached, it has been confirmed that the method being applied to the problem will not achieve an optimum solution. It can thus be appreciated that FIG. 4 corresponds to Steps 105 to 109 in FIG. 1, and the system must subsequently select another method.

Referring again to FIG. 4, the search point is updated in Step 25 in accordance with the nonlinear optimization method stored in the nonlinear optimization processor 11 and a decision is made on whether the search points have been converged.

The nonlinear optimization method employed in this arrangement may alternatively be any other method capable of sequentially improving the search point. Examples of such methods include a method of making the optimum point the next search point, the optimum point being obtained by making a linear search from the present search point along the sharp descending direction of the objective function, a method of presuming the coordinates of an optimum point by solving a quadratic programming problem resulting from the secondary approximation of an objective function at the present search point and the primary approximation of constraint functions or a method of generating sufficiently many points at random in the vicinity of the present search point and selecting the optimum point of an objective function from amongst those generated as the next search point.

Figure 8:
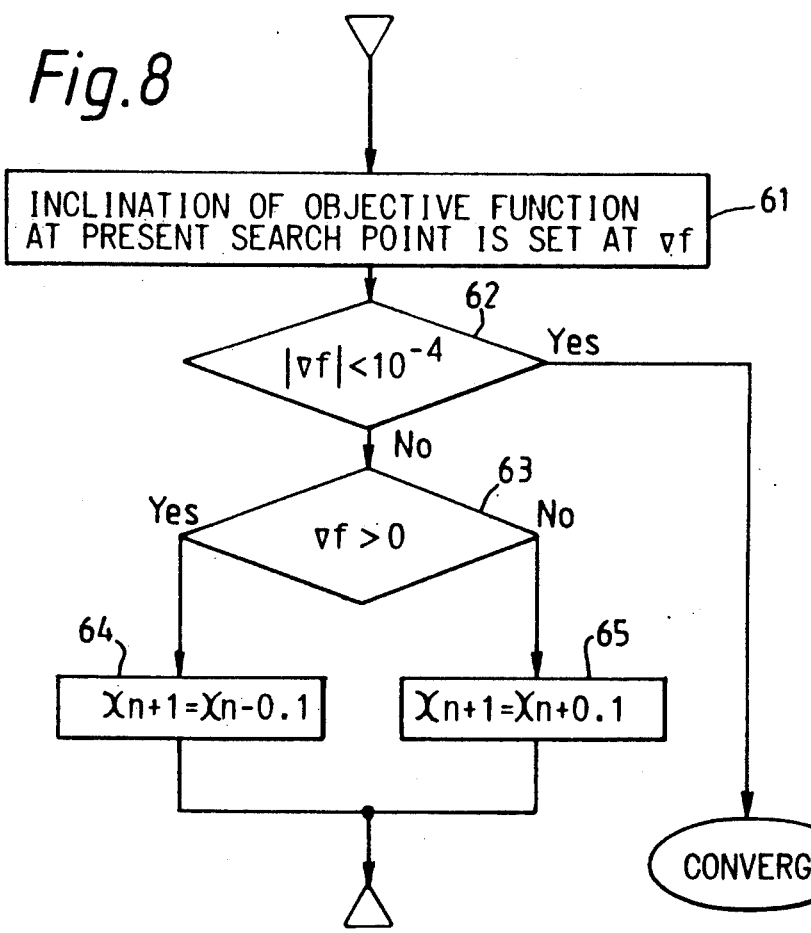
FIG. 8 is a further flow-chart showing another nonlinear optimization method.

In this arrangement, a simple optimization procedure shown in FIG. 8 is employed. At Step 61 of the procedure, an inclination of objective function at the present search point is obtained and set as $\nabla f$. In this arrangement, $\nabla f$ is considered as a criterion for deciding the convergence of the search points. At Step 62, the operation of solving problems is terminated if it is decided that the search points have converged to an optimum point when the convergence condition $|\nabla f| < 10^{-4}$ is satisfied. At Step 63, a decision is made as to whether $\nabla f$ is positive or negative to make the method branch off. At Step 64, the coordinates of the search point with a positive $\nabla f$ is decremented by 0.1 and at Step 65, the coordinates of the search point with a negative $\nabla f$ is incremented by 0.1 to update the search point.

At Step 26 in FIG. 4, the method is terminated by generating the results of nonlinear optimization calculations including e.g. the coordinates of the optimum point, and the value of the objective function when the search points are judged as being converged at Step 25.

A specific application of the present invention will now be described with reference to a simple nonlinear optimization problem. The nonlinear optimization problem under consideration is as follows:

Minimize $f(x) = (x - 1)^4$
Subject to no constraints

Hereinafter the i-th search point is represented by $x_i$. Moreover, the search start point is represented by $x_1$.

At Step 21, the rule for controlling the method of solving problems is supplied from the input unit 13 to the working memory 16 as shown in FIG. 2. At Step 22, $x_1 = 0.64$ is supplied as intermediate data to form the search start point. At Step 23, the coordinates of the present search point (0.46), the value of the objective function ($8.5 \times 10^{-2}$), and the inclination of the objective function ($-6.2 \times 10^{-4}$) are obtained and the results are made to correspond to search point numbers before being stored in the working memory 16.

At Step 24, the procedure shown in FIG. 7 is followed to verify the method of solving problems. In other words, i=1 in Step 51 and the 1st rule condition unit is called from the working memory 16 at Step 52 and evaluated at Step 53. The 1st rule condition unit is used to examine "whether there existed a search point taking the same coordinates of the present search point in the past". This condition unit is not satisfied at $x_1$. In the same way, the 2nd and the 3rd rule condition units are extracted and the evaluation process is repeated. All the condition units are assumed to be unsatisfied at $x_1$, i.e. it is assumed that all the rule execution units are not executed.

At Step 25, the procedure shown in FIG. 8 is followed to update the search point and make a convergent decision. Since $\nabla f = -6.2 \times 10^{-1}$ at $x_1$, a convergent condition is not achieved at Step 62. However, it is determined that $\nabla f < 0$ at Step 63 and the search point is updated to become $x_2 = x_1 + 0.1 = 0.56$ in Step 65.

The process returns to Step 23 and the method from Step 23 up to Step 25 is repeated for a new search point.

FIG. 9 shows a form of updating data regarding search points. Since $\nabla f < 0$ at the search point $x_7$, Step 64 is executed to reduce the coordinates of the search point to 0.1. As a result, the coordinates of $x_8$ become 0.96, which is equal to the coordinate value of $x_6$. Consequently, the test of "whether there existed a search point taking the same coordinates of the present search point in the past" in the first rule condition unit of FIG. 5 is satisfied and the execution unit executes the question of "incrementing the coordinates of the search point by 0.01." Then the coordinates of $x_8$ become $0.96 + 0.01 = 0.97$.

The 1st rule designates a countermeasure to prevent updating of the search point resulting in an infinite loop. The cause of such an infinite loop is not due to the specific nonlinear optimization method being applied at any time and therefore this rule is said to be common knowledge i.e. knowledge relating to the method of controlling the process of solving problems which is not specific to the nonlinear optimization method.

A new search point is set to $x_8'$ and any other condition unit is not established. The verification of the process of solving problems is assumed to be terminated.

For $x_8'$, the updating of the search point and the decision of convergence are executed in Step 25.

The procedure of FIG. 4 is followed likewise and the updating of the search point is repeated. At $x_{12}$ ultimately, the convergent condition $|\nabla f| < 10^{-4}$ of Step 62 is satisfied and the process of solving problems is terminated.

The simple nonlinear optimization method shown in FIG. 8 has been employed to simplify the explanation in this embodiment. However, efficient nonlinear optimization methods are stored in the nonlinear optimization processor 11 and usable, depending on the type of the problem. As the common knowledge is used to control the process of solving problems in the control processor 12, the common knowledge need not be modified even if the nonlinear optimization method is changed to another.

In this embodiment, the nonlinear optimization processor and the control processor are separate and the knowledge relating to the method of controlling the process of solving problems without relying on the nonlinear optimization technique is used to control the search point in the control processor. As a result, a general purpose nonlinear optimization apparatus equipped with means for preventing failures of solving problems without relying on a specific nonlinear optimization method can be fabricated.

Figure 10:
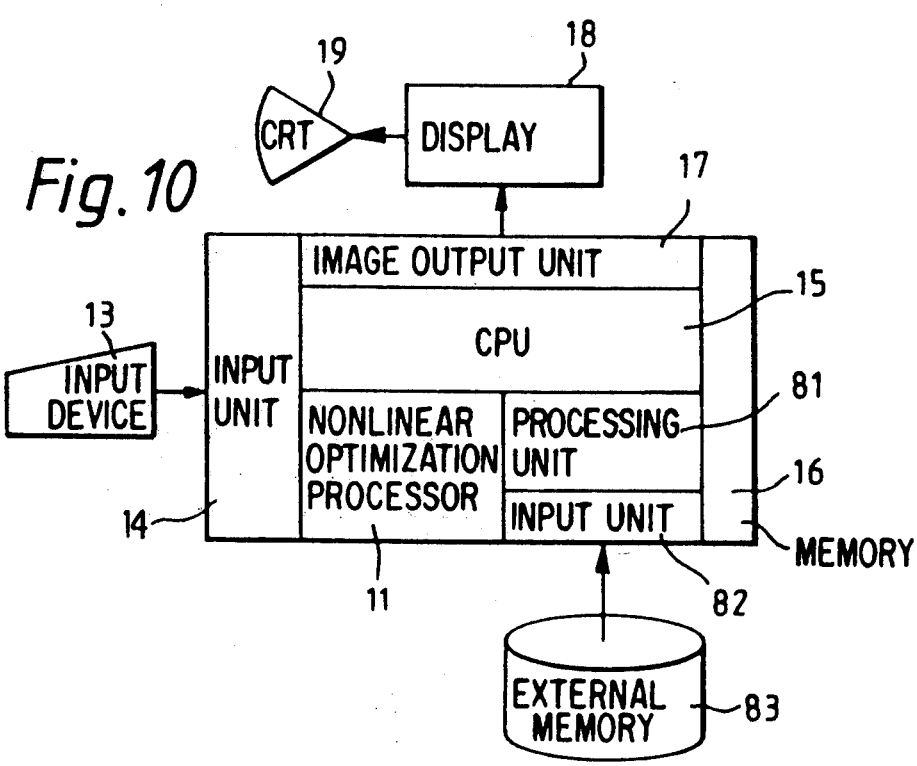
FIG. 10 is a block diagram of another embodiment of a computer system incorporating the present invention.

FIG. 10 shows another apparatus which may be used in the present invention. The apparatus shown in FIG. 10 is generally similar to that shown in FIG. 3, and the same reference numerals are used to indicate corresponding parts. In the apparatus shown in FIG. 10, however, there is an external memory 83 which stores the common knowledge, and the control processor 12 in FIG. 3 is divided into an input unit 82 which receives knowledge from the memory 83, and the processing part 81 which carries out the functions required by the control processor.

It can be appreciated that knowledge from the memory 83 need be extracted only when needed in the method of nonlinear optimization. It may thus be appreciated that Step 106 in FIG. 1 may be distributed into Step 108. The advantage of storing the common knowledge in a separate memory 83 is that it is then a simple matter to add additional common knowledge to that memory if desired.

Figure 11:
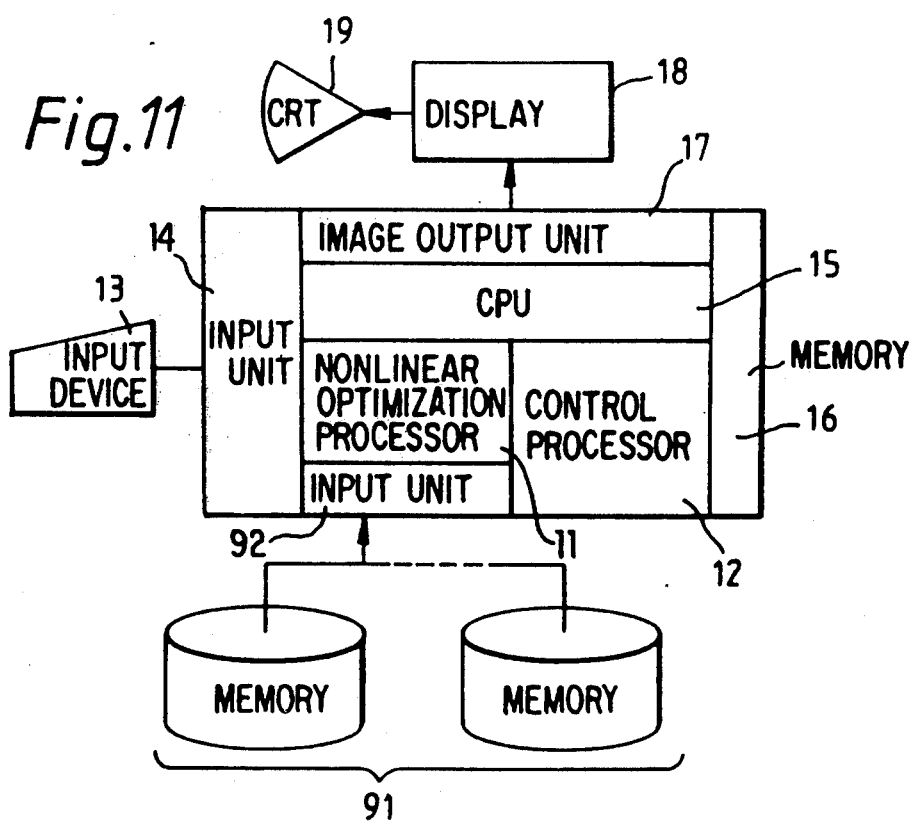
FIG. 11 is yet another computer system incorporating the present invention.

FIG. 11 shows a further apparatus for use in the present invention, which again represents a modification of the apparatus shown in FIG. 2. In the apparatus of FIG. 11, one or more memories 91 store domain knowledge, which is then passed to the nonlinear optimization processor 11 by an input unit 92. Of course, only that domain knowledge which applies to the method being applied to the problem is extracted from the memory 91 at any time. Again, the advantage of this arrangement is that it is possible readily to add additional domain knowledge to the external memories 91.

In practice, it is preferable that the apparatus has memories for both common and domain knowledge to minimize the size of the working memory that is needed, and such an arrangement is shown in FIG. 12. The components of FIG. 12 correspond to those of FIGS. 2, 10 and 11, with the same reference numerals being used to indicate corresponding parts, and therefore further description is unnecessary.

FIG. 13 shows an optimum control apparatus for a production system, which makes use of a nonlinear optimization apparatus embodying the present invention. In the arrangement shown in FIG. 11, the control of the production system 204 is to control an equipment control parameter 203 to maximize the amount of product 208 manufactured from raw material 207 per unit type under constraints such as the capabilities of the processing production equipment. Data relating to the operating conditions of the system is received from an input device 206, and is fed as an input parameter 201 to a control parameter decision apparatus 205. The control parameter decision apparatus 205 receives a feedback parameter 202 concerning the operating state of the system. In accordance with the present invention, the control parameter decision device may incorporate a nonlinear optimization apparatus being an embodiment of the present invention.

In such an arrangement, even if existing nonlinear optimization methods become unsuitable to solve the nonlinear optimization problems which define the production system, due to changes in the production system, the only thing that needs to be changed is the nonlinear optimization method used by the apparatus according to the present invention within the control parameter decision device 205. Thus, the system need not be changed even when the production system is altered, so that simplicity of operation can be achieved.

It can thus be seen that the present invention may be applied to the control of any industrial or technological plant or system. Furthermore, the present invention could be applied to the computer control of a financial operation such as a securities market.

Another field to which the present invention may be applied is in computer aided design (CAD) systems. One example of such a system is the design of a coil in which the radius of the wire of the coil, the number of turns of the coil, and the radius of each turn, must be selected, on the basis of the constraint that, for a given load, the deformation of the coil is not greater than a predetermined value. The system of the present invention could then be applied to such an arrangement to optimize the parameters of the coil so that it has minimum volume.

Figure 14:
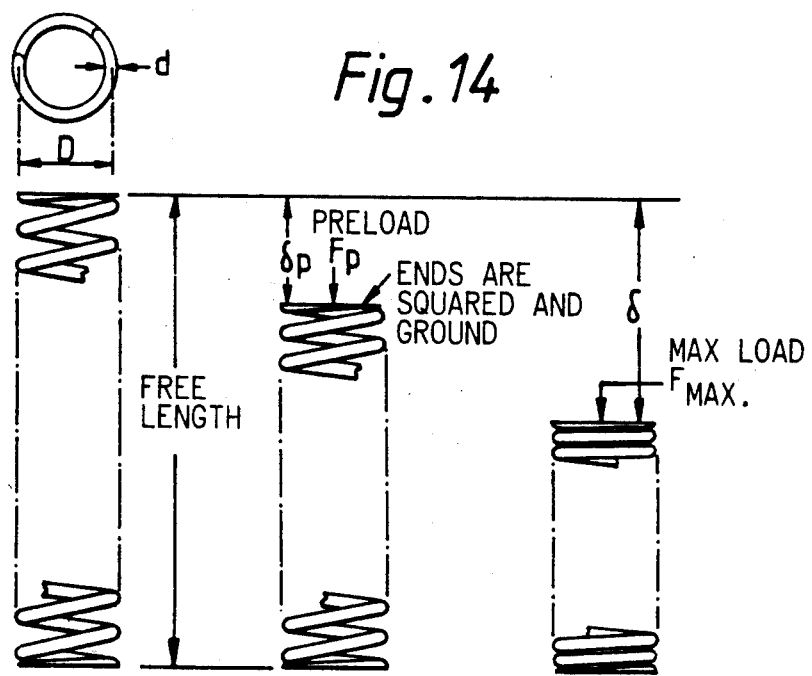
FIG. 14 shows a spring, for explaining an optimization problem to which the present invention may be applied.

Such an application will now be described in more detail with reference to FIG. 14, for determining minimum weight springs under static loading. It is assumed that the ends of the spring shown in FIG. 14 are closed and ground and the load is concentric.

a) Design Variables

| | |
|---|---|
| N = number of active coils | CNUM |
| D = mean coil diameter, in. | DIAC |
| d = wire diameter, in. | DIAW |

These quantities are adjusted to give the best design.

b) Specifications

The designer must provide data for the following specifications

| | |
|---|---|
| $F_{max}$ = maximum working load, lb | FSH |
| $l_{max}$ = maximum free length, in. | FLM |
| $d_{min}$ = minimum wire diameter, in. | WDMN |
| $D_{max}$ = maximum outside diameter of spring, in. | CDMX |
| $F_p$ = preload compression force, lb | PRLD |
| $\delta_{pm}$ = allowable maximum deflection under preload, in. | DELP |
| $\delta_w$ = deflection from preload position to maximum load position, in. | DELW |
| S = allowable maximum shear stress, psi | SA |
| G = shear modulus of the material, psi | G |
| E = modulus of elasticity, psi | EMOD |
| $C_E$ = end coefficient for spring | CE |

The end coefficient for spring buckling is similar to that used in buckling of ordinary compression members. Values can be obtained from Table 4.

TABLE 4

| END CONDITIONS | $C_E$ |
|---|---|
| Parallel ends, one end fixed, one end free laterally but not free to rotate | 1 |
| Both ends hinged | 1 |
| Parallel ends, both ends fixed | 2 |
| One end fixed, one end free to rotate and move laterally | 1/2 |

NGUIDE = ( 0 spring is unguided
( 1 spring is guided and buckling is precluded

A typical result is shown below.

INPUT SPECIFICATIONS

| | | |
|---|---|---|
| ALLOWABLE STRESS | 189000. | PSI |
| MODULUS OF ELASTICITY | .300E + 08 | PSI |
| SHEAR MODULUS | .115E + 08 | PSI |
| MAXIMUM WORKING LOAD | 1000.00 | LB |
| MAXIMUM FREE LENGTH | 14.00 | IN. |
| MINIMUM WIRE DIAMETER | .200 | IN. |
| MAXIMUM OUTSIDE SPRING DIAMETER | 3.00 | IN. |
| PRELOAD COMPRESSION FORCE | 300.00 | LB |
| MAXIMUM DEFLECTION UNDER PRELOAD | 6.00 | IN. |
| DEFLECTION FROM PRELOAD TO MAXIMUM LOAD | 1.25 | IN. |
| END COEFFICIENT | 1.0 | |
| SPRING IS GUIDED | | |

OPTIMUM VALUES OF DESIGN VARIABLES

| | | |
|---|---|---|
| WIRE DIAMETER | .263 | IN. |
| COIL MEAN DIAMETER | .91 | IN. |
| NUMBER OF COILS | 16.2 | |

DESIGN CHARACTERISTICS

| | | |
|---|---|---|
| VOLUME OF WIRE | 2.84 | CU IN. |
| LENGTH OF WIRE | 52.22 | IN. |
| FREE LENGTH | 6.59 | IN. |
| SPRING CONSTANT | 559.97 | LB/IN. |
| SOLID HEIGHT | 4.80 | IN. |
| DEFLECTION UNDER PRELOAD | .54 | IN. |
| DEFLECTION FROM PRELOAD TO MAXIMUM LOAD | 1.25 | IN. |
| BUCKLING LOAD | 163.26 | LB |
| RATIO COIL DIAMETER TO WIRE DIA | 3.46 | |

It is quite possible to overconstrain a spring design so that no feasible solution is possible. If a feasible solution cannot be found, it is suggested that one or more of the specifications be relaxed, such as free length or allowable stress, or even the maximum working load.

Several optimization trials can be combined. Optimum values of DIAW, DIAC and CNUM are returned and automatically used as starting values for the next trial, unless they are respecified. This is particularly useful in obtaining trade-off curves.

c) Optimization

The optimization criterion used is minimum volume of spring wire as stated above. Then:

$$U = \frac{\pi^2}{4} Dd^2 (N + 2) = \text{minimum}$$

(i) Stress Constraint (Wahl, 1963); the shear stress must be less than the specified allowable.

$$\phi_1 = S - C_f F_{max} \frac{D}{\pi d^3} \geq 0$$

where $$C_f = \frac{4C - 1}{4C - 4} + \frac{0.615}{C}$$

$$C = \frac{D}{d}$$

(ii) Configuration constraints; the spring free length must be less than the maximum specified. The spring constant K must first be determined (Wahl, 1963)

$$K = \frac{Gd^4}{8ND^3} \text{ lb/in.}$$

The deflection under the maximum working load is $$\delta = \frac{F_{max}}{K} \text{ in.}$$

It is assumed that the spring length under $F_{max}$ is 1.05 times the solid length. Thus the free length is $$l_f = \delta + 1.05(N+2)d$$

and the constraint is $$\phi_2 = l_{max} - l_f \geq 0$$

The wire diameter must exceed the specified minimum $$\phi_3 = d - d_{min} \geq 0$$

The outside diameter of the coil must be less than the maximum specified.

$$\phi_4 = D_{max} - D - d \geq 0$$

The mean coil diameter must be at least three times the wire diameter to ensure that the spring is not too tightly wound.

$$\phi_5 = C - 3 \geq 0$$

The deflection under preload must be less than the maximum specified. The preload deflection is $$\delta_p = \frac{F_p}{K}$$

The constraint is $$\phi_6 = \delta_{pm} - \delta_p \geq 0$$

The combined deflection must be consistent with the length.

$$\phi_7 = l_f - \delta_p - \frac{F_{max} - F_p}{K} - 1.05(N + 2)d \geqq 0$$

Strictly speaking this constraint should be an equality. It is intuitively clear that at convergence the constraint function will always be zero.

(iii) Deflection requirement; the deflection from preload to maximum load must be equal to that specified. This too is made an inequality constraint since it should always converge to zero.

$$\phi_8 = \frac{F_{max} - F_p}{K} - \delta_w \geqq 0$$

(iv) Buckling constraint (Wahl, 1963); the load at which buckling occurs is given by $$P_{cr} = \alpha_0 C_B$$

where $$\alpha_0 = l_f K$$

$$C_B = \frac{1}{2(1 - G/E)} \left[ 1 - \sqrt{1 - \frac{2\pi^2(1 - G/E)}{(1 + 2G/E)} \left( \frac{C_E D}{l_f} \right)^2} \right]$$

E = modulus of elasticity, psi
$C_E$ = end coefficient
A factor of safety of 1.25 is used to take care of uncertainty in predicting $P_{crit}$. The inequality constraint is $$\phi_9 = \frac{P_{crit}}{1.25} - F_{max} \geqq 0$$

If the spring is guided and $C_E$ has a value of zero, then this constraint is bypassed.

The invention could also be applied to the computer design of a bearing, in which it is desired to ensure that a shaft rotates with minimum friction.

Figure 15:
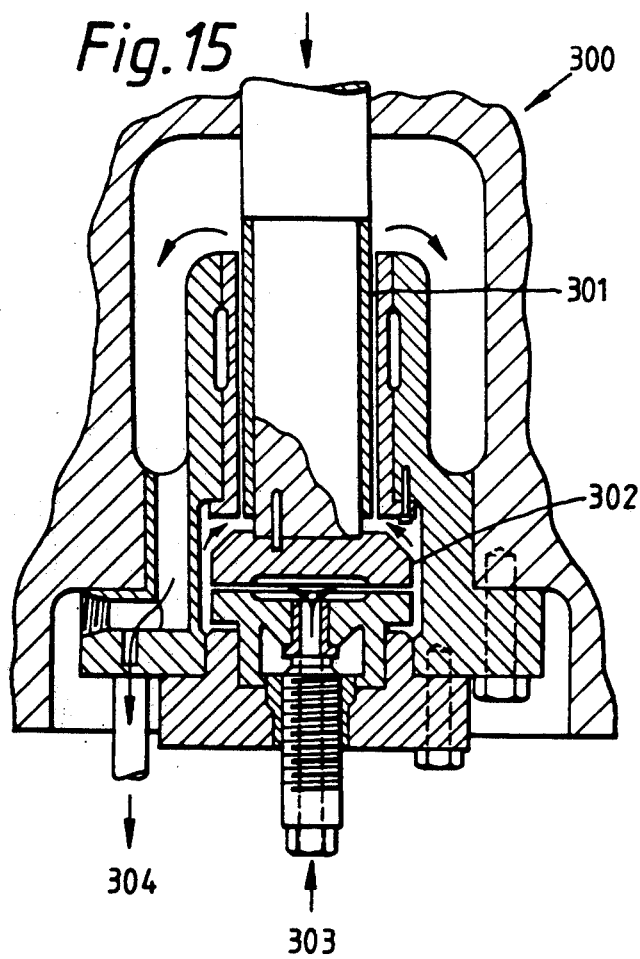
FIGS. 15 and 16 illustrate a hydrostatic thrust bearing, for explaining another optimization problem to which the present invention may be applied.
Figure 16:
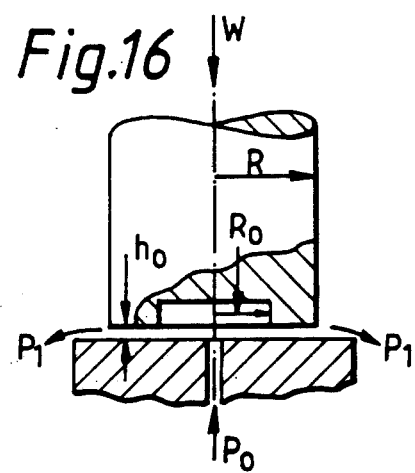

Such an application will now be described in more detail with reference to FIGS. 15 and 16, which show a hydrostatic thrust bearing for a turbogenerator. In FIG. 15, the bearing 300 has a guide bearing 301 and a step bearing 302, and an inlet 303 and an outlet 304 for oil. FIG. 16 shows the bearing schematically.

This example illustrates several important aspects of formulation for optimization.
1. It is an example of the difficulty sometimes encountered in choosing the design variables.
2. It shows that sometimes a state variable should be substituted for a more obvious independent design variable.
3. It illustrates how easily an important constraint can be overlooked, and how the computer brings this to the attention of the engineer.
4. The problem of accommodating variability is significant in this design. The conventional factor of safety approach is simply inapplicable.
5. The engineering modeling requires the sequential solution of a rather complex set of expressions which must be arranged in proper order so that the computer works with only known quantities, including the design variables which are always "known" to the computer whenever engineering modeling expressions are used.
6. It demonstrates how the designer's judgment can be introduced by the use of trade-off curves.

The criterion is to minimize power loss associated with the bearing.

The primary specifications are
Speed, 750 rpm
Weight of generator, 101,000 lb
Lubricant used, SAE 20 oil
Oil pump efficiency, 70%
Maximum oil pressure, 1000 psi
Maximum temperature rise of oil 50° F.
Minimum oil film thickness, 0.001 in.
a) Theory (Fuller, 1956)
The inlet pressure and flow rate are related by the following expression:

$$P_0 = \frac{6\mu Q}{\pi h_0^3} \ln \frac{R}{R_0} \quad (8.3.1)$$

where
Q = flow, in.$^3$/sec
$P_0$ = inlet pressure, psi gauge
$h_0$ = film thickness, in.
$\mu$ = oil viscosity in reyns, lb sec/in.$^2$
R = bearing step radius, in.
$R_0$ = recess radius, in.
The outlet pressure $P_1$ is assumed to be atmospheric. The load-carrying capacity is given by $$W = \frac{P_0 \pi}{2} \frac{(R^2 - R_0^2)}{\ln(R/R_0)} \text{ lb} \quad (8.3.2)$$

The pumping energy is $$E_p = Q(P_0 - P_1) \text{ in. lb/sec} \quad (8.3.3)$$

and the friction loss is $$E_f = \left( \frac{2\pi N}{60} \right)^2 \frac{2\pi \mu}{h_0} \left( \frac{R^4}{4} - \frac{R_0^4}{4} \right) \text{in. lb} \quad (8.3.4)$$

where N is the speed in revolutions per minute.
The frictional torque is $$M = \frac{2\pi N}{60} \frac{2\pi \mu}{h_0} \left( \frac{R^4}{4} - \frac{R_0^4}{4} \right) \text{in. lb.} \quad (8.3.5)$$

The temperature rise of the oil in passing through the bearing is estimated by $$t = \frac{E_f}{12 \times 778 Q \tau C} \text{ °F.} \quad (8.3.6)$$

where
$\tau$ = weight density of oil, lb/in.$^3$ = 0.0307
C = specific heat of oil, Btu/lb °F. = 0.50
The oil viscosity is a function of temperature, given by $$\log_{10} \log_{10} (\nu + 0.8) = n \log_{10} T + C_1 \quad (8.3.7)$$

where n and $C_1$ are constants for a given oil, $\nu$ is the kinematic viscosity in centistokes, and T is the absolute temperature, degrees Rankine (°F.+459.7).

The following chart gives $C_1$ and n for various grades of oil.

| Oil | $C_1$ | n |
| --- | --- | --- |
| SAE 5 | 10.85 | −3.91 |
| SAE 10 | 10.45 | −3.72 |
| SAE 20 | 10.04 | −3.55 |
| SAE 30 | 9.88 | −3.48 |
| SAE 40 | 9.83 | −3.46 |
| SAE 50 | 9.82 | −3.44 |

The viscosity conversion from centistokes to reyns is $$\text{reyns} = \text{St} \times \text{specific gravity} \times 1.45 \times 10^7$$

b) Design Options

The company using the bearing may wish to increase the minimum film thickness to permit passage of larger particles in the oil, so that the filtering cost can be reduced. They may also wish to use a pump having a lower or higher pressure capacity, depending on the cost. Trade-off curves are to be developed to assist in this decision. The effect of using a different grade of oil is also to be investigated.

c) Design Variables

The primary design variables are clearly R, $R_0$, and Q. It is not obvious whether or not there is another independent design variable, and it is necessary to examine all the equality expressions and state variables involved in feasibility. The basic expressions are Eqs. (8.3.1), (8.3.2), (8.3.4), (8.3.6) and (8.3.7).

The temperature T can be assumed to be approximated by the mean of the ambient and oil outlet temperatures. We shall assume ambient is 100° F., and thus $$T = 560 + \frac{\Delta T}{2} \qquad (8.3.8)$$

We can also convert viscosity $\nu$ to $\mu$. The specific gravity of the oil is $$s = \frac{0.0307 \times 1728}{62.4} = 0.8502$$

Thus $$\mu = \nu(0.8502)1.45 \times 10^{-7} = 1.233 \times 10^{-7}\nu \qquad (8.3.9)$$

or $$\nu = 8.112 \times 10^6 \mu$$

The state variables are $P_0$, $\mu$, W, $E_f$, $\Delta T$, and $h_0$. There are therefore six state variables and five expressions, and it is clear that one of these must be taken as a design variable. It is actually most convenient to make $\mu$ the design variable. It can be seen in the following section that this avoids difficulties with transcendental expressions and the need for an equality constraint and an additional design variable.

To summarize, the design variables are R, $R_0$, Q and $\mu$.

d) Optimization Criterion

The criterion is to minimize total power loss to the bearing. We must now set up expressions in sequence so that the computer begins with known values of the design variables.

We begin by obtaining $\Delta T$ as a function of $\mu$, using Eqs (8.3.7) to (8.3.9).

$$n \times \log_{10}\left(560 + \frac{\Delta T}{2}\right) = \qquad (8.3.10)$$

$$\log_{10}\log_{10}(8.112 \times 10^6 \mu + 0.8) - C_1$$

The value for $\Delta T$ can readily be extracted from this. The next step is to use Eq. (8.3.6) to obtain $E_f$.

$$E_f = 12 \times 778 Q \tau c \Delta T \qquad (8.3.11)$$

Equation (8.3.4) can be rearranged to yield $h_0$.

$$h_0 = \left(\frac{2\pi N}{60}\right)^2 \frac{2\pi \mu}{E_f} \left(\frac{R^4}{4} - \frac{R_o^4}{4}\right) \qquad (8.3.12)$$

Similarly, Eq. (8.3.1) gives $P_0$.

$$P_0 = \frac{6\mu Q}{\pi h_o^3} \ln \frac{R}{R_0} \qquad (8.3.1)$$

And finally Eq. (8.3.3) is required for pumping power, modified to include pump efficiency.

$$E_p = \frac{Q(P_0 - P_1)}{0.70} \qquad (8.3.3)$$

The optimization expression is $$U = E_f + E_p = \text{minimum power} \qquad (8.3.13)$$

in inches-pounds per second.

e) Constraints

(i) Maximum load; the only remaining undefined state variable is W. It is obtained from Eq. (8.3.2) that:

$$W = \frac{P_0 \pi}{2} \frac{R^2 - R_o^2}{\ln(R/R_0)}$$

The specified load $W_s$ must be less than W.

$$\phi_1 = W - W_s > 0 \qquad (8.3.14)$$

(ii) Oil pressure; the inlet oil pressure must be less than the specified maximum, designated $P_{max}$.

$$\phi_2 = P_{max} - P_0 \geq 0 \qquad (8.3.15)$$

(iii) Oil temperature rise; the oil temperature rise must be less than specification, designated $\Delta T_{max}$.

$$\phi_3 \Delta T_{max} - \Delta T \geq 0 \qquad (8.3.16)$$

(iv) Oil film thickness; the oil film thickness is not to be less than a specified amount $h_{min}$.

$$\phi_4 = h_0 - h_{min} \geq 0 \qquad (8.3.17)$$

It should be noted that the designer has left all specifications in symbolic form, so that different specifications can be easily tried for this design and so that the same program can be easily adapted to later similar designs.

(v) Other constraint; R must be greater than $R_0$.

$$\phi_5 = R - R_0 \geqq 0 \quad (8.3.18)$$

Initial results suggest that, as formulated, the two radii R and $R_0$ are approaching an optimum equal value. This is not a physically meaningful solution; and it is characteristic of optimization problems in these circumstances to have convergence problems. It is also a warning that something is missing in the engineering modeling for the problem, i.e., a constraint. A review of the theoretical basis for the expression relating to $P_0$ to Q,R, and $R_0$ discloses that the assumption is made that $R - R_0$ is much greater than $h_0$, so that entrance and exit losses are negligible and the flow is essentially laminar. The exit loss will be $\tau v_e^2/2g$, where $v_e$ is the exit velocity; and the entrance loss will be of the same order. We shall therefore require that twice the exit loss be 0.1% of the pressure drop $P_0$.

$$\phi_6 = 0.001 - \frac{\frac{\tau}{g}\left(\frac{Q}{2\pi R h_0}\right)^2}{P_o} \geqq 0 \quad (8.3.19)$$

If the difference between R and $R_o$ becomes very small, there is also risk of excessive contact pressure in the event of hydrostatic pressure loss. A constraint is therefore provided for this failure mode, assuming 5000 psi is acceptable to avoid surface damage.

$$\phi_7 = 5000 - \frac{W}{\pi(R^2 - R_o^2)} \geqq 0 \quad (8.3.20)$$

A more sophisticated study may also require consideration of cavitation and instability problems.

These are, however, merely examples of the application of the present invention to computer aided design and are derived from the book "Optimal Engineering Design, Principles and Applications" by J. N. Siddall, published by Marcel Detcker Inc in 1982. It should be stressed that there are optimization problems to which the present invention may be applied. A wide range of applications will then be immediately apparent to persons skilled in the art.

It should be noted that in the above description an apparatus according to the present invention is illustrated having a separate nonlinear optimization processor 11, control processor 12, and external memories 83, 91. This is not essential and the method of the present invention may be executed on a suitable standard computer. What is important, however, is that the common knowledge, and possibly also the domain knowledge, is stored separately from the methods, to minimize the memory space needed. Many different nonlinear optimization methods may be stored, and if it is desired to add a further method, it is a relatively straightforward matter to add only that domain knowledge relating to that particular method.

Whilst the present invention relates to a general method of solving nonlinear optimization problems, it should be noted that the present application relates only to the use of such a method of nonlinear optimization in computer controlled systems relating to optimization of real world technological and industrial systems which involve optimization of nonlinear variables characterizing the system, i.e. physical arrangements which apply to optimize the performance of processes, machines, manufacturing, or compositions, or even to computer controlled financial management systems involving computers. Abstract uses of the methods underlying the present invention, in computation research, algorithm research, or nonlinear mathematical research activities, form no part of the present invention.

What is claimed is:

1. A method of computer controlled nonlinear optimization comprising the steps of:
   a) storing a plurality of nonlinear optimization methods in a first memory area of a computer;
   b) storing in a second memory area of said computer, separately from said methods, a plurality of techniques for controlling said methods, said techniques being applicable to all said methods;
   c) inputting to said computer a problem for which an optimum solution is sought;
   d) extracting a selected method from said first memory area;
   e) extracting one or more of said plurality of techniques from said second memory area;
   f) applying, by means of said computer said selected methods to sad problem to obtain a possible solution, the application of said selected method in said computer being controlled by said extracted one or more of said plurality of techniques; and
   g) repeating steps (d) to (f) in said computer for successive ones of said methods until an optimum one of said possible solutions is obtained.

2. A method according to claim 1, wherein said step (e) is carried out during said step (f).

3. A method for optimizing by computer the performance of a computer controlled process using computer controlled nonlinear optimization, the method comprising the steps of:
   a) storing a plurality of nonlinear optimization methods in a first memory area of a computer;
   b) storing in a second memory area of said computer, separately from said methods, a plurality of techniques for controlling said methods, said techniques being applicable to all said methods;
   c) inputting to said computer a problem relating to the performance of said controlled process for which an optimum solution is sought;
   d) extracting a selected method from said first memory area;
   e) extracting one or more of said plurality of techniques from said second memory area;
   f) applying by means of said computer said selected methods to sad problem to obtain a possible solution, the application of said selected method in said computer being controlled by said extracted one or more of said plurality of techniques;
   g) repeating steps (d) to (f) in said computer for successive ones of said methods until an optimum one of said possible solutions is obtained, thereby to obtain an optimized solution to said problem; and
   h) controlling said process by said computer to obtain an optimum performance of said process.

4. A method according to claim 3, wherein said process is an industrial process.

5. A method for optimizing by computer the performance of a computer controlled process using computer controlled nonlinear optimization, the method comprising the steps of:
   a) storing a plurality of nonlinear optimization methods in a first memory area of a computer;

b) storing in a second memory area of said computer, separately from said methods, a plurality of techniques for controlling said methods, said techniques being applicable to all said methods;
c) inputting to said computer a problem relating to the performance of said controlled process for which an optimum solution is sought;
d) extracting a selected method from said first memory area;
e) extracting one or more of said plurality of techniques from said second memory area;
f) applying by means of said computer said selected methods to sad problem to obtain a possible solution, the application of said selected method being controlled by said extracted one or more of said plurality of techniques;
g) repeating steps (d) to (f) in said computer for successive ones of said methods until an optimum one of said possible solutions is obtained, thereby to obtain an optimized solution to said problem; and
h) controlling said process by said computer to obtain an optimum performance of said system.

6. A method according to claim 5 wherein said system is an industrial system.

7. A method of computer controlled nonlinear optimization comprising the steps of:
a) storing a plurality of nonlinear optimization methods in a first memory area of a computer;
b) storing in a second memory area of said computer, separately from said methods, a plurality of first techniques for controlling said methods, said techniques being applicable to all said methods;
c) storing in a third memory area of said computer, separate from said methods, a plurality of second techniques each of said second techniques relating to a corresponding one of said methods;
d) inputting to said computer a problem for which an optimum solution is sought;
e) extracting a selected method from said first memory area;
f) extracting from aid third memory area any one of said second techniques corresponding to said selected method;
g) extracting one or more of said plurality of techniques from said second memory area;
h) applying by means of said computer said selected methods to said problem to obtain a possible solution, the application of said selected method in said computer being controlled by said extracted one or more of said plurality of first techniques and said extracted second techniques; and
e) repeating steps (e) to (h) in said computer for successive said methods until an optimum one of said possible solutions is obtained.

8. A method according to claim 7, wherein said step (g) is carried out during said step (h).

9. A method of computer aided design of an industrial or technological device by computer controlled nonlinear optimization, the method comprising the steps of:
a) storing a plurality of nonlinear optimization methods in a first memory area of a computer;
b) storing in a second memory area of said computer, separately from said methods, a plurality of techniques for controlling said methods, said techniques being applicable to all said methods;
c) inputting a problem to said computer, said problem relating to the parameters of said device, which parameters are to be optimized subject to predetermined constraints;
d) extracting a selected method from said first memory area;
e) extracting one or more of said plurality of techniques from said second memory area;
f) applying, by means of said computer said selected methods to sad problem to obtain a possible solution, the application of said selected method being controlled by said extracted one or more of said plurality of techniques;
g) repeating steps (d) to (f) in said computer for successive ones of said methods until an optimum one of said possible solutions is obtained, thereby to obtain an optimized solution to said problem; and
deriving optimized parameters for said device.

10. A method of computer aided design of an industrial or technological system by computer controlled nonlinear optimization, the method comprising the steps of:
a) storing a plurality of nonlinear optimization methods in a first memory area of a computer;
b) storing in a second memory area of said computer, separately from said methods, a plurality of techniques for controlling said methods, said techniques being applicable to all said methods;
c) inputting a problem to said computer, said problem relating to the parameters of said system, which parameters are to be optimized subject to predetermined constraints;
d) extracting a selected method from said first memory area;
e) extracting one or more of said plurality of techniques from said second memory area;
f) applying by means of said computer said selected methods to sad problem to obtain a possible solution, the application of said selected method being controlled by said extracted one or more of said plurality of techniques;
g) repeating steps (d) to (f) in said computer for successive ones of said methods until an optimum one of said possible solutions is obtained, thereby to obtain an optimized solution to said problem; and
deriving optimized parameters for said system.

11. A method of nonlinear optimization comprising the steps of:
a) storing a plurality of nonlinear optimization methods in a first memory area;
b) storing in a second memory area, separately from said methods, a plurality of techniques for controlling said methods, said techniques being applicable to all said methods;
c) inputting a problem for which an optimum solution is sought;
d) extracting a selected method from said first memory area;
e) extracting one or more of said plurality of techniques from said second memory area;
f) applying said selected method to said problem to obtain a possible solution, the application of said selected method being controlled by said extracted one or more of said plurality of techniques; and
g) repeating steps (d) to (f) for successive ones of said methods until an optimum one of said possible solutions is obtained.

12. A method of computer controlled nonlinear optimization comprising the steps of:

a) storing a plurality of programs each representing a nonlinear optimization method in a first memory area of a computer;
b) storing in a second memory area, separately from said methods, a plurality of data representing techniques for controlling said methods, said techniques being applicable to all said methods;
c) inputting to said computer a problem for which an optimum solution is sought;
d) extracting a selected program corresponding to a selected method from said first memory area;
e) extracting one or more of said plurality of techniques from said second memory area;
f) running said selected program in said computer to apply said selected method to said problem to obtain a possible solution, the application of said selected method being controlled by said data representing said extracted one or more of said plurality of techniques; and
g) repeating steps (d) to (f) in said computer for successive ones of said methods until an optimum one of said possible solutions is obtained.

13. An apparatus for nonlinear optimization comprising:
a) memory means having first and second memory areas for:
  (i) storing a plurality of nonlinear optimization methods in said first memory area of said memory means; and
  (ii) storing in said second memory area, separately from said methods, a plurality of techniques for controlling said methods, said techniques being applicable to all said methods;
b) input means for the input of a problem for which an optimum solution is sought;
c) a processor for repeatedly:
  (i) extracting a selected method from said first memory area;
  (ii) extracting one or more of said plurality of techniques from said second memory area; and
  (iii) applying said selected methods to said problem to obtain a possible solution, the application of said selected method being controlled by said plurality of techniques; thereby to obtain an optimum possible solution to said problem.

14. An apparatus for optimizing the performance of a controlled process using nonlinear optimization, the apparatus comprising:
a) memory means having first and second memory areas for:
  (i) storing a plurality of nonlinear optimization methods in said first memory area of said memory means; and
  (ii) storing in said second memory area, separately from said methods, a plurality of techniques for controlling said methods, said techniques being applicable to all said methods;
b) input means for the input of a problem relating to said controlled process for which an optimum solution is sought;
c) a processor for repeatedly:
  (i) extracting a selected method from said first memory area;
  (ii) extracting one or more of said plurality of techniques from said second memory area;
  (iii) applying said selected methods to said problem to obtain a possible solution, the application of said selected method being controlled by said extracted one or more of said plurality of techniques thereby to obtain an optimum possible solution to said problem; and
d) means for controlling the performance of said process on the basis of said optimum possible solution.

15. An apparatus for optimizing the performance of a controlled system using nonlinear optimization, the apparatus comprising:
a) memory means having first and second memory areas for:
  (i) storing a plurality of nonlinear optimization methods in said first memory area of said memory means; and
  (ii) storing in said second memory area, separately from said methods, a plurality of techniques for controlling said methods, said techniques being applicable to all said methods;
b) input means for the input of a problem relating to said controlled system for which an optimum solution is sought;
c) a processor for repeatedly:
  (i) extracting a selected method from said first memory area;
  (ii) extracting one or more of said plurality of techniques from said second memory area;
  (iii) applying said selected methods to said problem to obtain a possible solution, the application of said selected method being controlled by said plurality of techniques, thereby to obtain an optimum possible solution to said problem; and
d) means for controlling the performance of said controlled system on the basis of said optimum possible solution.

16. An apparatus for computer aided design of an industrial or technological device or system by computer controlled nonlinear optimization, the apparatus comprising:
a) memory means having first and second memory areas for:
  (i) storing a plurality of nonlinear optimization methods in said first memory area of said memory means; and
  (ii) storing in said second memory area, separately from said methods, a plurality of techniques for controlling said methods, said techniques being applicable to all said methods;
b) input means for the input of a problem relating to parameters of said device or system, which parameters are to be optimized subject to predetermined constraints;
c) a processor for repeatedly:
  (i) extracting a selected method from said first memory area;
  (ii) extracting one or more of said plurality of techniques from said second memory area;
  (iii) applying said selected methods to said problem to obtain a possible solution, the application of said selected method being controlled by said plurality of techniques, thereby to obtain an optimum possible solution to said problem; and
d) means for displaying said optimized parameters for said device or system on the basis of said optimum possible solution.

17. An apparatus for nonlinear optimization, the apparatus comprising:
a) memory means having first, second and third memory areas for:

(i) storing a plurality of nonlinear optimization methods in said first memory area;

(ii) storing in said second memory area, separately from said methods, a plurality of first techniques for controlling said methods, said techniques being applicable to all said methods; and (iii) storing in said third memory area, separate from said methods, a plurality of second techniques each of said second techniques relating to a corresponding one of said methods;

input means for the input of a problem for which an optimum solution is sought;

c) a processor for repeatedly:

(i) extracting a selected method from said first memory area;

(ii) extracting from said third memory area any of said second techniques corresponding to said selected method;

(iii) extracting one or more of said plurality of techniques from said second memory area; and (iv) applying said selected methods to said problem to obtain a possible solution, the application of said selected method being controlled by said plurality of techniques and said extracted second techniques, thereby to obtain an optimum possible solution to said problem.

* * * * *

UNITED STATES PATENT AND TRADEMARK OFFICE
CERTIFICATE OF CORRECTION

Page 1 of 6

PATENT NO. : 5,195,026
DATED : March 16, 1993
INVENTOR(S) : Hisanori Nonaka, et. al.

It is certified that error appears in the above-indentified patent and that said Letters Patent is hereby corrected as shown below:

| Column | Line | |
|---|---|---|
| Title page, Abstract | 1 | After "optimization" insert --,--. |
| 1 | 34 | Change "co-ordinates" to --coordinates--. |
| 1 | 36 | The word after "mization" should read --problem--. |
| 1 | 37 | After "problem" insert --,--. |
| 1 | 38 | After "to" insert --,--; after "e.g." insert --,--. |
| 2 | 2 | After "methods" insert --from--. |
| 2 | 3 | After "(e.g." insert --,--. |
| 2 | 15 | After "knowledge" insert --,--. |
| 2 | 27 | After "i.e." insert --,--. |
| 2 | 61 | Delete "," (first occurrence). |
| 3 | 25 | Change "flow chart" to --flow-chart--. |
| 3 | 31 | Change "flow chart" to --flow-chart--. |

UNITED STATES PATENT AND TRADEMARK OFFICE
CERTIFICATE OF CORRECTION

PATENT NO. : 5,195,026
DATED : March 16, 1993
INVENTOR(S) : Hisanori Nonaka, et. al.

It is certified that error appears in the above-indentified patent and that said Letters Patent is hereby corrected as shown below:

| Column | Line | |
|---|---|---|
| 3 | 60 | After "methods" insert --,--. |
| 3 | 62 | Delete "common" (first occurrence). |
| 3 | 65 | Delete --,--. |
| 4 | 12 | After "i.e." insert --,--. |
| 4 | 18 | After "i.e." insert --,--. |
| 4 | 19 | Change "ar" to --are--. |
| 4 | 33 | Align "Approximation". |
| 5 | 5 | After "2 = 0" insert --)--. |
| 5 | 6 | After "1 =" insert --0--. |
| 5 | 10 | Insert horizontal line above "Name of Condition Content". |
| 5 | 14 | Change "is" to --has--. |

UNITED STATES PATENT AND TRADEMARK OFFICE
CERTIFICATE OF CORRECTION

PATENT NO. : 5,195,026
DATED : March 16, 1993
INVENTOR(S) : Hisanori Nonaka, et. al.

It is certified that error appears in the above-indentified patent and that said Letters Patent is hereby corrected as shown below:

| Column | Line | |
|---|---|---|
| 5 | 25 | Change "Legrangian" to --Lagrangian--. |
| 5 | 58 | After "i.e." insert --,--. |
| 6 | 17 | After "by" insert --,--; after "e.g." insert --,--. |
| 6 | 56 | After "i.e." insert --,--. |
| 8 | 12 | After "including" insert --,--; after "e.g." insert --,--. |
| 8 | 47 | After "i.e." insert --,--. |
| 9 | 6 | After "knowledge" (first occurrence) insert --,--; after "i.e." insert --,--. |
| 10 | 24 | After "device" insert --205--. |
| 11 | 7 | Change type face to non-italic. |
| 11 | 8 | Change type face to non-italic. |
| 11 | 24 | Delete "½". |

UNITED STATES PATENT AND TRADEMARK OFFICE
CERTIFICATE OF CORRECTION

PATENT NO. : 5,195,026
DATED : March 16, 1993
INVENTOR(S) : Hisanori Nonaka, et. al.

Page 4 of 6

It is certified that error appears in the above-indentified patent and that said Letters Patent is hereby corrected as shown below:

| Column | Line | |
|---|---|---|
| 11 | 25 | After "unguided" insert --)--. |
| 11 | 27 | After "precluded" insert --)--. |
| 12 | 44 | Change "24" to --$\geq$--. |
| 13 | 3 | Change "$l_f$" to --$l_f$--. |
| 13 | 5 | After "speaking" insert --,--. |
| 13 | 10 | After "This" insert --,--; after "too" insert --,--; after "constraint" insert --,--. |
| 13 | 24 | Change "$l_j K$" to --$l_j K$--. |
| 16 | 57 | Insert --=-- between "$\phi_3$" and "$\Delta$" |
| 17 | 2 | Move "(8.3.18)" to align with right side of column. |
| 17 | 66 | After "i.e." insert --,--. |
| 18 | 21 | After "computer" insert --,--. |

UNITED STATES PATENT AND TRADEMARK OFFICE
CERTIFICATE OF CORRECTION

PATENT NO. : 5,195,026
DATED : March 16, 1993
INVENTOR(S) : Hisanori Nonaka, et. al.

It is certified that error appears in the above-indentified patent and that said Letters Patent is hereby corrected as shown below:

| Column | Line | |
|---|---|---|
| 18 | 22 | Change "sad" to --said--. |
| 18 | 49 | After "applying" insert --,--; after "computer" insert --,--. |
| 18 | 50 | Change "sad" to --said--. |
| 19 | 6 | Change "process" to --system--. |
| 19 | 13 | Change "sad" to --said--. |
| 19 | 35 | After "techniques" (first occurrence) insert --,--. |
| 19 | 41 | Change "aid" to --said--. |
| 19 | 52 | Change "e)" to --i)--. |
| 20 | 7 | After "computer" insert --,--. |
| 20 | 8 | Change "sad" to --said--. |

UNITED STATES PATENT AND TRADEMARK OFFICE
CERTIFICATE OF CORRECTION

PATENT NO. : 5,195,026
DATED : March 16, 1993
INVENTOR(S) : Hisanori Nonaka, et. al.

It is certified that error appears in the above-indentified patent and that said Letters Patent is hereby corrected as shown below:

| Column | Line | |
|---|---|---|
| 20 | 35 | After "applying" insert --,--; after "computer" insert --,--. |
| 20 | 36 | Change "sad" to --said--. |
| 21 | 67 | Delete "a"; change "solution" to --solutions--. |
| 22 | 1,2 | After "techniques" insert --,--. |
| 23 | 8,9 | After "techniques" insert --,--. |
| 23 | 11 | Before "input" (first occurrence) insert --b)--. |
| 24 | 11 | After "plurality of" insert --first--. |

Signed and Sealed this

Twenty-sixth Day of April, 1994

Attest:

BRUCE LEHMAN

*Attesting Officer*    *Commissioner of Patents and Trademarks*